(12) United States Patent
Rozman et al.

(10) Patent No.: US 7,710,058 B2
(45) Date of Patent: May 4, 2010

(54) MOTOR DRIVE ARCHITECTURE FOR HIGH FREQUENCY AC BUS

(75) Inventors: Gregory I. Rozman, Rockford, IL (US); Kevin Dooley, Mississauga (CA)

(73) Assignees: Hamilton Sundstrand Corporation, Windsor Locks, CT (US); Pratt & Whitney Canada Corp., Longueuil, Quebec (CA)

( * ) Notice: Subject to any disclaimer, the term of this patent is extended or adjusted under 35 U.S.C. 154(b) by 273 days.

(21) Appl. No.: 11/955,616

(22) Filed: Dec. 13, 2007

(65) Prior Publication Data

US 2009/0151362 A1    Jun. 18, 2009

(51) Int. Cl.
*H02P 27/08* (2006.01)
*H02M 5/40* (2006.01)
*F02C 7/32* (2006.01)

(52) U.S. Cl. ............... 318/494; 318/139; 318/473; 318/400.04; 318/801; 322/10; 322/44; 244/53 R; 244/58

(58) Field of Classification Search .......... 318/139, 318/712, 400.04, 718, 494, 473, 801; 290/52; 244/58, 134 R, 53 R; 322/10, 44
See application file for complete search history.

(56) References Cited

U.S. PATENT DOCUMENTS

| | | | |
|---|---|---|---|
| 3,939,387 A | 2/1976 | Maeda | |
| 4,459,535 A | 7/1984 | Schutten | |
| 4,689,543 A | 8/1987 | Hucker | |
| 4,879,639 A | 11/1989 | Tsukahara | |
| 4,927,329 A * | 5/1990 | Kliman et al. | 416/127 |
| 4,939,441 A * | 7/1990 | Dhyanchand | 318/718 |
| 5,005,115 A | 4/1991 | Schauder | |
| 5,006,768 A | 4/1991 | Rozman | |
| 5,055,700 A * | 10/1991 | Dhyanchand | 290/31 |
| 5,493,201 A * | 2/1996 | Baker | 322/10 |
| 5,635,811 A | 6/1997 | Rebhan | |
| 5,747,971 A | 5/1998 | Rozman | |
| 5,955,862 A | 9/1999 | Nguyen Phuoc | |
| 6,109,229 A * | 8/2000 | Pels | 123/179.6 |
| 6,774,590 B2 * | 8/2004 | Inagawa et al. | 318/139 |
| 6,791,204 B2 * | 9/2004 | Sarlioglu et al. | 290/52 |
| 6,847,194 B2 * | 1/2005 | Sarlioglu et al. | 322/10 |
| 6,891,346 B2 | 5/2005 | Simmons | |
| 6,998,726 B2 * | 2/2006 | Sarlioglu et al. | 290/31 |
| 7,045,986 B2 * | 5/2006 | Anghel et al. | 318/712 |
| 7,184,927 B2 * | 2/2007 | Anghel et al. | 318/400.04 |
| 7,207,521 B2 * | 4/2007 | Atkey et al. | 244/58 |
| 7,210,653 B2 * | 5/2007 | Atkey et al. | 244/58 |
| 7,227,271 B2 * | 6/2007 | Anghel et al. | 290/31 |
| 7,309,974 B2 * | 12/2007 | Sarlioglu et al. | 322/47 |
| 7,439,634 B2 * | 10/2008 | Michalko | 307/43 |
| 7,583,046 B2 * | 9/2009 | Maddali et al. | 318/700 |

(Continued)

FOREIGN PATENT DOCUMENTS

EP    1347552    9/2003

OTHER PUBLICATIONS

European Search Report mailed Mar. 19, 2009.

*Primary Examiner*—Paul Ip
(74) *Attorney, Agent, or Firm*—Carlson, Gaskey & Olds

(57) ABSTRACT

A motor drive for an electric motor receives high frequency AC current, and delivers this current through a converter which is operable to change the current delivered downstream to an inverter and an electric motor.

6 Claims, 2 Drawing Sheets

U.S. PATENT DOCUMENTS

| | | |
|---|---|---|
| 2002/0079706 A1 | 6/2002 | Rebsdorf et al. |
| 2004/0056487 A1* | 3/2004 | Sarlioqlu et al. .............. 290/52 |
| 2004/0057257 A1* | 3/2004 | Sarlioglu et al. .............. 363/49 |
| 2004/0090204 A1 | 5/2004 | McGinley |
| 2004/0108726 A1* | 6/2004 | Sarlioglu et al. .......... 290/38 R |
| 2004/0129835 A1* | 7/2004 | Atkey et al. .............. 244/118.5 |
| 2005/0007044 A1* | 1/2005 | Qiu et al. .................... 318/254 |
| 2006/0061213 A1* | 3/2006 | Michalko .................... 307/9.1 |
| 2006/0102790 A1* | 5/2006 | Atkey et al. ............. 244/134 R |
| 2006/0113967 A1 | 6/2006 | Dooley |
| 2006/0250107 A1 | 11/2006 | Jadric et al. |
| 2007/0267540 A1* | 11/2007 | Atkey et al. .................... 244/58 |
| 2007/0284480 A1* | 12/2007 | Atkey et al. ............. 244/135 R |

\* cited by examiner

MOTOR DRIVE ARCHITECTURE FOR HIGH FREQUENCY AC BUS

BACKGROUND OF THE INVENTION

This application relates to a motor drive for an electric motor wherein a high frequency AC power is supplied to a converter which can change the current supplied downstream to an inverter and then to the motor.

Electric motors are utilized in various applications. In one recent improvement to aircraft turbine engines, a plurality of electric motors are driven off an accessory bus. These motors may include pumps for supplying oil, fuel and air to the engine, as an example.

For various reasons, it has recently been proposed to utilize a high frequency AC power bus to supply electrical power to these accessories. One such system is disclosed in U.S. patent application Ser. No. 11/859,055, filed on Sep. 21, 2007 and entitled "Generator for Gas Turbine Engine Having Main DC Bus Accessory AC Bus."

It is also known in the art to provide a converter to change a voltage delivered to an electric motor, wherein DC power is utilized.

However, there have been no AC buses which are provided with a converter for changing the current actually delivered to the motors.

SUMMARY OF THE INVENTION

In the disclosed embodiment of this invention, AC current is provided. A converter changes the current actually supplied to the motor. In one embodiment, there are a plurality of such motors associated with an AC bus.

These and other features of the present invention can be best understood from the following specification and drawings, the following of which is a brief description.

DETAILED DESCRIPTION OF THE PREFERRED EMBODIMENT

Figure 1:
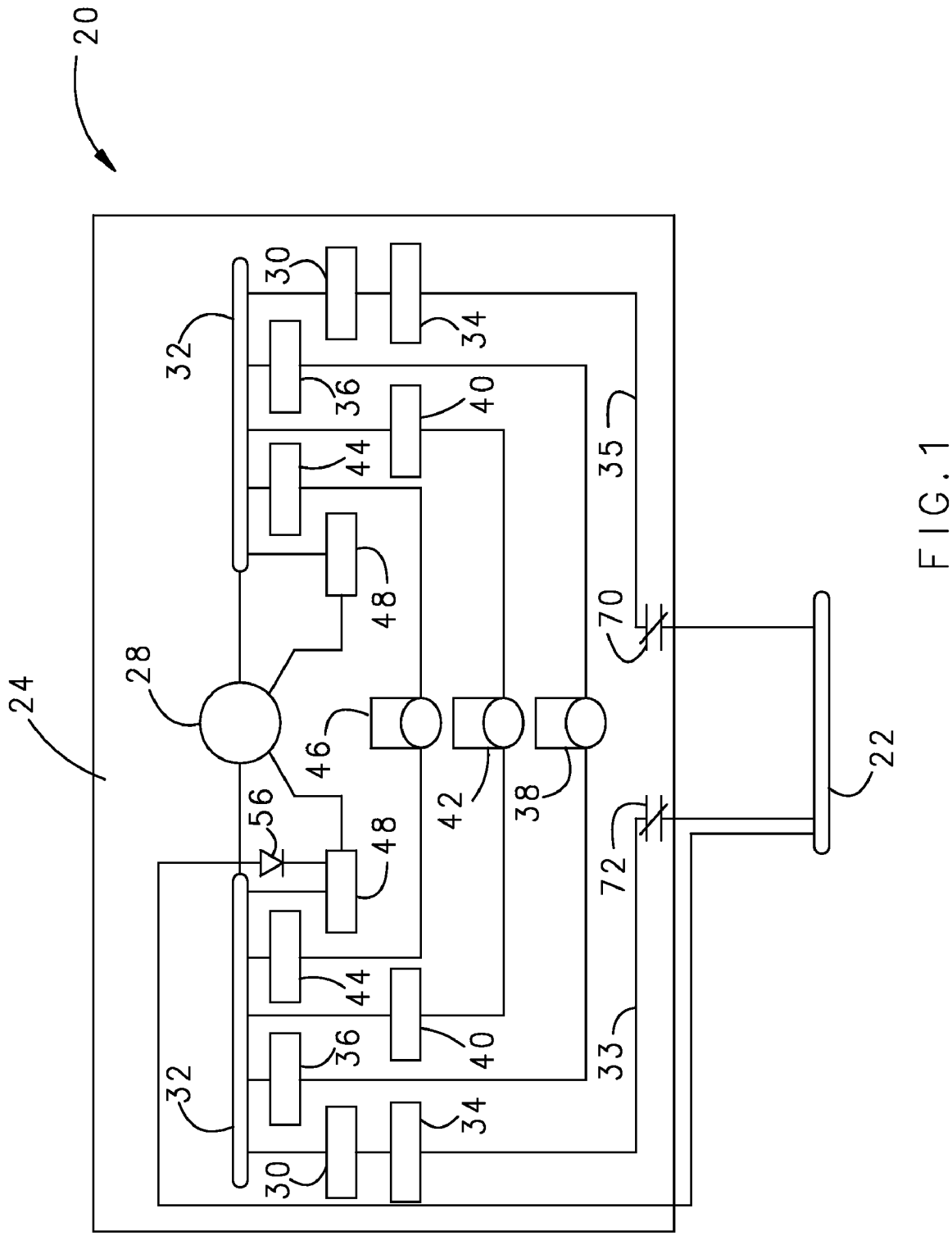
FIG. 1 is a schematic of a system architecture for the motors associated with a gas turbine engine.

FIG. 1 shows a system 20 including an engine 24 associated with an aircraft. The electrical system for engine 24 will be described, but it should be understood that a similar second engine, not illustrated, having a similar system, may be included. An aircraft DC bus 22 receives power from a generator 28, as will be explained. A pair of inverter/rectifiers 30 receive the power generated by the generator 28, and distribute that power to the aircraft DC bus 22. Power from the inverter/rectifiers 30 passes through filters 34, and through lines 33 and 35 to the aircraft DC bus 22. Motor controllers 36, 40 and 44 provide control to an air pump and its motor 38, a lube pump and its motor 42, and a fuel pump and its motor 46. The generator as disclosed is a permanent magnet generator, but this application does extend to other type generators.

FIG. 1 shows a system 20 including a starter/generator system 24 associated with an aircraft more-electric engine. The electrical system for starter/generator system 24 will be described, but it should be understood that a similar second more-electric engine, not illustrated, having a similar system, may be included. An aircraft DC bus 22 receives power from a generator 28. A pair of inverter/rectifiers 30 receive the power generated by the generator 28, and distribute that power to the aircraft DC bus 22. Power from the inverter/rectifiers 30 passes through filters 34, and through lines 33 and 35 to the aircraft DC bus 22. Motor controllers 36, 40 and 44 provide control to an air pump and its motor 38, a lube pump and its motor 42, and a fuel pump and its motor 46. The generator as disclosed is a permanent magnet generator, but this application does extend to other type generators.

As illustrated, generator 28 is an integrated starter-generator. However, it should be understood that this application extends not only to an integrated starter-generator operating in a generator mode, but also to stand-alone generators. One known electrical system is disclosed in United States published patent applications 2004/039202A1, 2006/0226721A1, and 2006/0113967A1.

In the present invention, an accessory bus 32 receives AC power from the generator 28. This high frequency AC current is utilized to drive the motors 46, 42, and 38 through the associated controllers 44, 40 and 36.

The use of high frequency AC for the engine accessory bus reduces dynamic interaction between system components. For example, in an architecture with a DC engine accessory bus, there could be undesirable voltage modulation on an engine accessory DC bus if the bus is connected to a high performance motor drive, such as a fuel pump. This phenomenon is known as a negative impedance instability. The high frequency AC bus 32 eliminates this possibility, and provides other valuable benefits.

Figure 2:
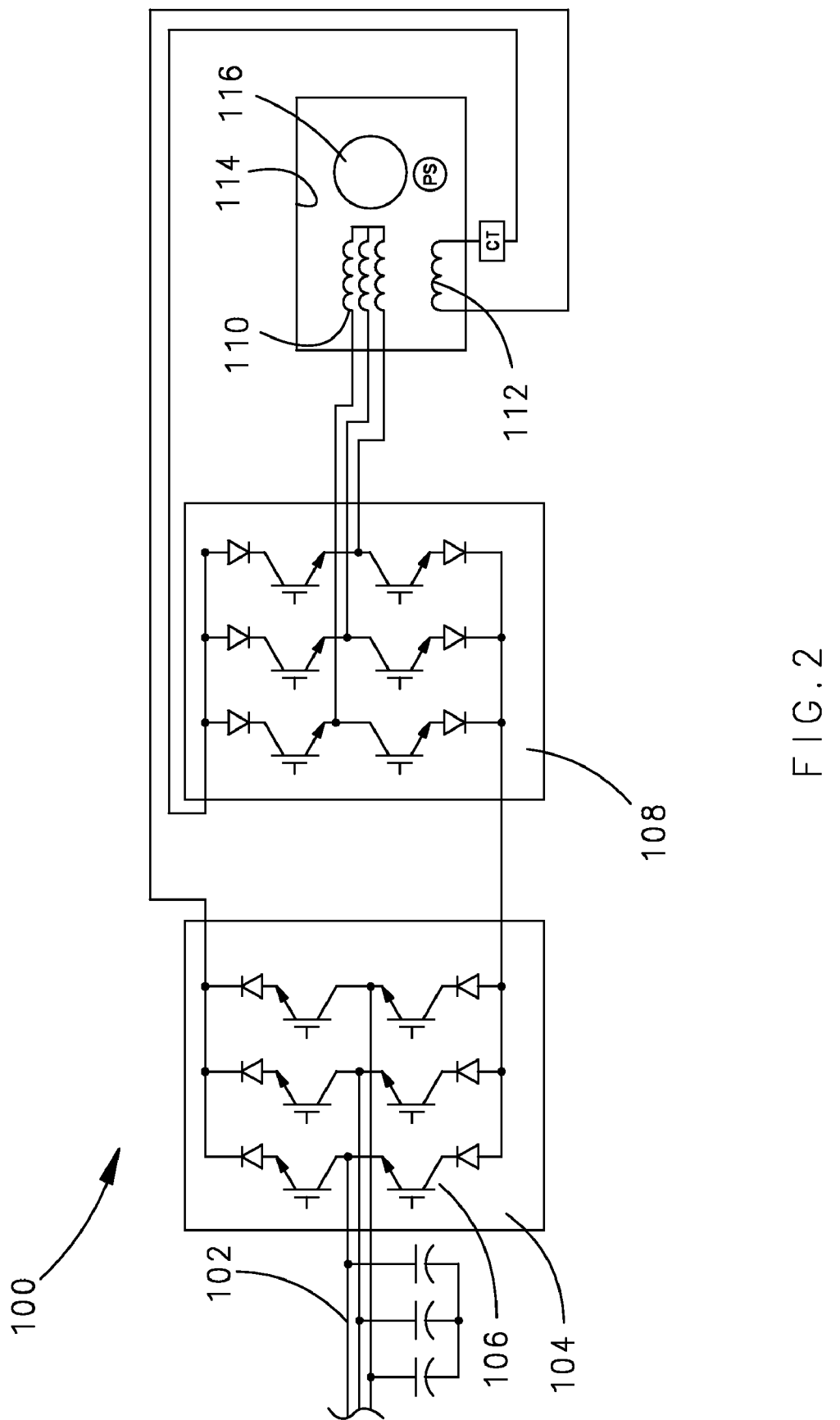
FIG. 2 shows a power topology for one of the motors of FIG. 1.

The control circuit 100 as illustrated in FIG. 2 receives the three-phase high frequency AC power over lines 102. These lines are connected to a PWM rectifier 104 which operates as a converter for changing the current actually delivered downstream to an inverter 108. The converter 104 includes a plurality of capacitors and switches 106 which may be controlled with pulse-width modulation to control the current supplied downstream to the inverter 108, and to the motor stator windings 110. As shown, a control coil 112 from the converter 104 may extend inwardly into the motor housing 114. The currents in the stator windings set up a field that drives the rotor 116. As is clear, the control coil 112 is connected to one output line of the converter 104, and connects back into a line connected to the inverter 108.

While an embodiment of this invention has been disclosed, a worker of ordinary skill in this art would recognize that certain modifications would come within the scope of this invention. For that reason, the following claims should be studied to determine the true scope and content of this invention.

What is claimed is:

1. A motor and associated motor drive comprising:
an AC power supply delivering three phase current, said AC power supply connected through a converter which is operable to change the magnitude of current delivered downstream of said converter;
an inverter downstream of said converter for controlling the three phases of AC power delivered to stator windings of an electric motor, and a rotor driven by the field set up by the currents in said stator windings; and
a control coil positioned to be within a housing for the motor, said control coil being connected to an output of said converter.

2. The motor and associated power supply as set forth in claim 1, wherein said converter is controlled by pulse-width modulation.

3. The motor and associated power supply as set forth in claim 1, wherein said control coil is further connected to an output of said inverter.

4. An aircraft engine and associated systems comprising:
a gas turbine engine, said gas turbine engine that provides motive power to the generator to generate electric power;
a plurality of electric motors for driving accessories of said gas turbine engine, and said generator generating electrical power which is delivered to a high frequency AC bus to drive said plurality of electric motors;
a control circuit for said plurality of electric motors including a converter which is operable to change the magnitude of current delivered downstream of said converter, and an inverter downstream of said converter for controlling three phases of AC power delivered to stator windings of at least one of said plurality of electric motors, and a rotor driven by said stator windings; and
a control coil positioned to be within a housing for the motor, said control coil being connected to an output of said converter.

5. An aircraft engine as set forth in claim 4, wherein said converter is controlled by pulse-width modulation.

6. The aircraft engine as set forth in claim 4, wherein said control coil is further connected to an output of said inverter.

* * * * *